3,353,950
PROCESS FOR THE PRODUCTION OF FINELY PARTICULATE HIGH PURITY COPPER POWDER
Helmut Junghanss, Duisburg, Germany, assignor to Duisburger Kupferhutte, Duisburg, Germany, a corporation of Germany
No Drawing. Filed July 29, 1965, Ser. No. 475,873
Claims priority, application Germany, Aug. 12, 1964, D 45,177
7 Claims. (Cl. 75—.5)

ABSTRACT OF THE DISCLOSURE

This specification describes a process for the production of finely divided high purity copper powder. The process starts with a cupric compound which is reduced, preferably with metallic copper, to form cuprous chloride. The cuprous chloride is then reacted with a source of hydroxyl, for example, lye, to produce cuprous oxide which is precipitated and separated from the reaction mass. The separated cuprous oxide is then reacted with a strong oxy acid such as, for example, sulfuric acid to disproportionate and thus form a mixture of precipitated copper powder and cupric sulfate. After recovering the copper powder from the reaction mass, the cupric sulfate is reduced as, for example, by reaction with sulfur dioxide, in the presence of a chlorine-containing material to produce cuprous chloride, which cuprous chloride can be recycled to reaction with lime, as stated above. Part of the produced copper may be used as the reducing agent.

---

The invention relates to a multi-stage process for the production of finely particulate, high-purity copper powder from solutions containing copper.

There are already numerous processes by which copper powder may be obtained by reduction from copper compounds using a variety of starting materials and reducing agents. The conditions under which these processes are carried out also vary. For example it is known that copper powder may be precipitated from aqueous solutions by cathodic reduction at high current densities. Processes are also known in which copper powder is precipitated under pressure and at high temperature by gaseous reducing agents from solutions which optionally contain other metals, for example cobalt or nickel.

In other processes, copper powder is prepared in the dry phase by the reduction of copper oxides with suitable solid and/or gaseous, organic or inorganic reducing agents. In addition, it has recently been proposed to obtain copper powder by a purely chemical process (a wet process), in which an ammoniacal copper tetramine sulfate solution is reduced with sulfur dioxide, after which the resulting cuprous sulfite-ammonium sulfite double salt is separated and then reacted with sulfuric acid to form metallic copper powder and copper sulfate.

Although this last process avoids the high capital and running costs which electrolysis or pressure reduction processes involve, it is unfortunately limited to neutral or at most weakly acidic copper solutions because, if strongly acidic solutions are used, it is necessary to add not only sufficient ammonia to form the copper tetramine complex, but also an additional quantity in order to neutralise the acid. In addition, the process cannot be applied to complex solutions, which contain other heavy metals in addition to copper, for example, those of the type formed in the lixiviation of purple ore subjected to chloridising roasting.

The present invention relates to a multi-stage process for the production of finely particulate, high-purity copper powder, which process is not subjected to the restrictions mentioned above and in which, in particular, the copper-containing starting solution may contain any amount of free acid and, in addition to copper, optional amounts of other metals. The process is characterised by the combination in a single sequence of several process stages, the first of which comprises reducing solutions containing copper and chlorine ions so as to form monovalent copper ions, followed by the precipitation and separation of cuprous chloride which, in the second stage, is reacted in aqueous suspension with an alkali to form cuprous oxide. The third stage comprises reacting the separated cuprous oxide with sulfuric acid to form the desired copper powder and copper sulfate by disproportionation, and the copper sulfate solution, separated from the copper powder, is treated in the fourth stage with sulfur dioxide while adding compounds yielding chloride ions, for example common salt, after which the precipitated cuprous chloride is separated and returned to the second stage.

The process is illustrated by the following description of its various stages:

The starting solution containing cupric and chloride ions is reduced in accordance with the equation.

$$Cu^{2+} + e^- \rightarrow Cu^+ \qquad (1a)$$

In principle, reduction may be carried out with any desired reducing agent, for example hydrazine or sulfur dioxide. It would be particularly suitable and economical to use, for this reduction, part of the metallic copper powder obtained in the third stage of the process according to the invention. Due to its fineness, this copper powder guarantees a quick reaction largely independent of the p-H value of the solution, which would not be the case if other reducing agents were used. If, even after its preparation, the copper-containing starting solution does not contain a sufficient concentration or an excess of chloride ions, as is the case, for example, with the solutions obtained after the chloridizing roasting of purple ore, chloride ions have to be added in order that the process according to the invention may be carried out. This may be done, for example, by adding common salt or, providing these solutions do not contain any sulfate ions, by adding calcium chloride. The chloride ion concentration is preferably such that, where reduction is carried out with metallic copper, twice the stoichiometric equivalent, based on copper, is present in the solution. In cases where different reducing agents are used, however, only the stoichiometric equivalent need be present. If the concentration of chloride ions is below these limits, precipitation of the reduced, monovalent copper as cuprous chloride is incomplete. If, however, the number of chloride ions exceeds these limits, part of the cuprous chloride remains dissolved as the dichloro complex anion $[CuCl_2]^-$.

The monovalent copper formed in accordance with Equation (1a) is precipitated from the solution containing chloride ions in accordance with the equation $$Cu^+ + Cl^- \rightarrow CuCl \qquad (1b)$$

on account of the low solubility of cuprous chloride.

As in the process stages described further on, the precipitate and mother liquor are separated from one another in known manner, for example, by way of thickeners, rotary or band filters or centrifuges. Depending on its composition, the mother liquor may be re-used for lixiviation, worked up for the residual metals which it contains or simply discarded. In instances where the content of chloride ions is very high, the liquor still contains fairly large amounts of copper which may be separated by subsequent cementation with iron or zinc scrap and used again, for example, in the first stage of the process according to the invention.

The separated cuprous chloride is reacted in the second stage of the process with compounds yielding hydroxyl ions, for example alkali metal hydroxides or carbonates, or alkaline-earth metal hydroxides or carbonates, but preferably lime, in accordance with the equation $$2CuCl + 2OH^- \rightarrow Cu_2O + 2Cl^- + H_2O \quad (2)$$

This reaction is practically quantitative at pH-values between 6 and 8. If lime is used, separation of the solid from the liquid leaves a worthless mother liquor containing calcium chloride which may either be discarded or partly re-used in the first and/or fourth stage of the process as a chloride-ion donor.

In the third stage of the process according to the invention, the separated cuprous oxide is decomposed with an oxyacid, for example phosphoric acid, perchloric acid, but preferably sulfuric acid, in accordance with the equation $$Cu_2O + 2H^+ \rightarrow Cu + Cu^{2+} + H_2O \quad (3)$$

precipitation of the desired copper powder being accompanied by disproportionation of the monovalent copper. The reaction illustrated by Equation 3 proceeds very rapidly and almost quantitatively at pH values below 3. Since the decomposition reaction in accordance with Equation 3 has already been preceded by two precipitations of the copper in the form of cuprous chloride and cuprous oxide, the resulting copper powder is very pure and, after separation and washing of the mother liquor, is eminently suitable for powder-metallurgical, analytical or reduction purposes. Depending on the purpose for which it is to be used, the grain size of the desired copper powder may be varied within certain limits by using a fairly high or fairly low temperature, together with a fairly high or fairly low concentration of the cuprous oxide suspension to be decomposed in accordance with Equation 3.

The oxyacid used for the disproportionation of the cuprous oxide may have any desired concentration. If the process is carried out cyclically, it would therefore be of particular advantage to use for the decomposition of cuprous oxide the $H_2SO_4$-containing mother liquor which is formed in the fourth stage of the process by reduction of the bivalent copper with sulfur dioxide and which is left after separation of the precipitated cuprous chloride. In this way, the process may be completed without adding sulfuric acid. The mother liquor left after separation of the copper powder contains bivalent copper and is reduced, for example, with gaseous sulfur dioxide in the fourth stage of the process according to the invention. If sulfur dioxide is used as the reducing agent, the reaction proceeds in accordance with the equation $$2Cu^{2+} + SO_2 + 2Cl^- + 2H_2O \rightarrow 2CuCl + SO_4^{2-} + 4H^+ \quad (4)$$

Because it is only sparingly soluble, the resulting cuprous chloride is precipitated from the solution, separated and then returned to the second stage of the process.

In order to carry out the reaction in accordance with Equation 4, the solution must contain chloride ions which, as already mentioned with regard to the first stage of the process, may be added, for example, in the form of solid common salt or the waste calcium chloride liquor which is formed during the second stage of the process, in which case the calcium sulfate which is precipitated is separated and discarded. The quantity in which the chloride ions are added will depend upon the concentration of copper in the solution. They should be added in a stoichiometric proportion in accordance with Equation 4 or in slight excess. A large excess should be avoided if, as proposed above, the sulfuric acid solution left after separation of the cuprous chloride is to be returned to the third stage of the process to decompose more cuprous oxide in accordance with Equation 3. In this instance, the excess of chloride ions would remove an equivalent amount of monovalent copper from the disproportionation and so would reduce the yield of the desired copper powder.

If the chloride ions required for the reaction according to Equation 4 are introduced into the solution in the form of common salt and if the sulfuric acid solution is, as already described, returned after reduction to the third stage of the process, the concentration of sodium sulfate in this recycled solution increases. This salt may be readily removed from the solution by cooling at any suitable point along the circuit, and represents a useful by-product of the process.

Naturally, it would be equally possible to feed the solution containing sulfuric acid and sodium sulfate into the residual liquor left after the first stage of the process, and to continue working with it. In some cases, it may even be of advantage to use the solution for a purpose not connected with the process according to the invention, for example for the lixiviation of purple ore subjected to chloridising roasting.

The process according to the invention is once again summarised by the following equations and by the gross equation derived from them for the entire process. The equations apply, without restricting the process, to the case where metallic copper is used as the reducing agent, common salt as the source of chloride ions and lime as the alkali and where the $H_2SO_4$-containing liquor formed during the fourth stage of the process is recycled to the third stage:

$$\text{I. } CuCl_2 + Cu \rightarrow CuCl \quad (5)$$

$$\text{II. } 4CuCl + 2CaO \rightarrow 2Cu_2O + 2CaCl_2 \quad (6)$$

$$\text{III. } 2Cu_2O + 2H_2SO_4 \rightarrow 2Cu + 2CuSO_4 + 2H_2O \quad (7)$$

$$\text{IV. } 2CuSO_4 + SO_2 + 2NaCl + 2H_2O \rightarrow 2CuCl + Na_2SO_4 + 2H_2SO_4 \quad (8)$$

Addition of the Equations 5–8 produces the following gross equation for the entire process:

$$CuCl_2 + 2CaO + SO_2 + 2NaCl \rightarrow Cu + 2CaCl_2 + Na_2SO_4 \quad (9)$$

What is claimed is:

1. A process for the production of finely particulate, high purity copper powder wherein,
   (a) in a first stage, a solution containing bivalent copper and chloride ions is reduced and the so produced cuprous chloride is precipitated and separated,
   (b) in a second stage, an aqueous suspension of cuprous chloride is reacted with a compound yielding hydroxyl ions and the so produced cuprous oxide is precipitated and separated,
   (c) in a third stage the cuprous oxide from the second stage is disproportionated with an oxy acid to give copper powder and the cupric salt of the oxy acid and
   (d) in a fourth stage the cupric salt of the oxy acid is reacted with a reducing agent and a compound yielding chloride ions, and cuprous chloride is precipitated and recycled to the second stage.

2. A process for the production of finely particulate high purity copper powder wherein
   (a) in a first stage, a solution containing bivalent copper and chloride ions is reduced with a reducing agent selected from the group consisting of hydrazine, sulfur dioxide and copper powder from the third stage, and the so produced cuprous chloride is precipitated and separated,
   (b) in a second stage, an aqueous suspension of cuprous chloride is reacted with a compound yielding hydroxyl ions and the so produced cuprous oxide is precipitated and separated,
   (c) in a third stage the cuprous oxide from the second stage is disproportionated with an oxy acid to give copper powder and the cupric salt of the oxy acid and
   (d) in a fourth stage the cupric salt of the oxy acid is reacted with a reducing agent and a compound yielding chloride ions, and the so produced cuprous chloride is precipitated and recycled to the second stage.

3. A process for the production of finely particulate high purity copper powder wherein,
(a) in a first stage, a solution containing bivalent copper and chloride ions, is reduced and the so produced cuprous chloride is precipitated and separated,
(b) in a second stage, an aqueous suspension of cuprous chloride is reacted with a compound yielding hydroxyl ions selected from the group consisting of alkali metal hydroxides, alkali metal carbonates, alkaline earth metal hydroxides and alkaline earth metal carbonates and the so produced cuprous oxide is precipitated and separated,
(c) in a third stage the cuprous oxide from the second stage is disproportionated with an oxy acid to give copper powder and the cupric salt of the oxy acid and
(d) in a fourth stage the cupric salt of the oxy acid is reacted with a reducing agent and a compound yielding chloride ions, and the so produced cuprous chloride is precipitated and recycled to the second stage.

4. A process for the production of finely particulate high purity copper powder wherein
(a) in a first stage, a solution containing bivalent copper and chloride ions is reduced and the so produced cuprous chloride is precipitated and separated,
(b) in a second stage, an aqueous suspension of cuprous chloride is reacted with a compound yielding hydroxyl ions and the so produced cuprous oxide is precipitated and separated,
(c) in a third stage the cuprous oxide from the second stage is disproportionated with an oxy acid selected from the group consisting of phosphoric acid, perchloric acid and sulfuric acid, to give copper powder and the cupric salt of the oxy acid and
(d) in a fourth stage the cupric salt of the oxy acid is reacted with a reducing agent and a compound yielding chloride ions, and the so produced cuprous chloride is precipitated and recycled to the second stage.

5. A process for the production of finely particulate high purity copper powder wherein
(a) in a first stage, a solution containing bivalent copper and chloride ions is reduced with a reducing agent selected from the group consisting of hydrazine, sulfur dioxide and copper powder from the third stage and the so produced cuprous chloride is precipitated and separated,
(b) in a second stage, an aqueous suspension of cuprous chloride is reacted with a compound yielding hydroxyl ions selected from the group consisting of alkali metal hydroxides, alkali metal carbonates, alkaline earth metal hydroxides, and alkaline earth metal carbonates and the so produced cuprous oxide is precipitated and separated,
(c) in a third stage the cuprous oxide from the second stage is disproportionated with an oxy acid selected from the group consisting of phosphoric acid, perchloric acid and sulfuric acid to give copper powder and the cupric salt of the oxy acid and
(d) in a fourth stage the cupric salt of the oxy acid is reacted with a reducing agent and a compound yielding chloride ions, and the so produced cuprous chloride is precipitated and recycled to the second stage.

6. A process for the production of finely particulate high purity copper powder wherein
(a) in a first stage, a solution containing bivalent copper and chloride ions is reduced with a reducing agent selected from the group consisting of hydrazine, sulfur dioxide and copper powder from the third stage, and the so produced cuprous chloride is precipitated and separated,
(b) in a second stage, an aqueous suspension of cuprous chloride is reacted with a compound yielding hydroxyl ions selected from the group consisting of alkali metal hydroxides, alkali metal carbonates, alkaline earth metal hydroxides and alkaline earth metal carbonates and cuprous oxide is precipitated and separated,
(c) in a third stage the cuprous oxide from the second stage is disproportionated with an oxy acid selected from the group consisting of phosphoric acid, perchloric acid and sulfuric acid to give copper powder and the cupric salt of the oxy acid and
(d) in a fourth stage the cupric salt of the oxy acid is reacted with sulfur dioxide and a compound yielding chloride ions, and the so produced cuprous chloride is precipitated and recycled to the second stage.

7. A process for the production of finely particulate high purity copper powder wherein
(a) in a first stage, a solution containing bivalent copper and chloride ions is reduced with metallic copper and the so produced cuprous chloride is precipitated and separated,
(b) in a second stage, an aqueous suspension of cuprous chloride is reacted with lime and the so produced cuprous oxide is precipitated and separated,
(c) in a third stage, the cuprous oxide from the second stage is disproportionated with sulfuric acid forming copper powder and cupric sulfate and
(d) in a fourth stage the cupric sulfate is reduced with sulfur dioxide in the presence of a source of chloride ions selected from the group consisting of sodium chloride and calcium chloride and the so produced cuprous chloride is precipitated and recycled to the second stage and the sulfuric acid-containing mother liquor is recycled to the third stage.

References Cited

FOREIGN PATENTS 1,153,907  9/1963  Germany.

DAVID L. RECK, *Primary Examiner.*

HYLAND BIZOT, *Examiner.*

W. W. STALLARD, *Assistant Examiner.*

UNITED STATES PATENT OFFICE
CERTIFICATE OF CORRECTION

Patent No. 3,353,950            November 21, 1967

Helmut Junghanss

It is hereby certified that error appears in the above numbered patent requiring correction and that the said Letters Patent should read as corrected below.

Column 1, line 72, for "subjected" read -- subject --; column 4, line 25, for "$CuCl_2 + Cu \longrightarrow CuCl$" read -- $CuCl_2 + Cu \longrightarrow 2CuCl$ --; column 6, line 21, after "and" insert -- the so produced --.

Signed and sealed this 10th day of December 1968.

(SEAL)
Attest:

Edward M. Fletcher, Jr.            EDWARD J. BRENNER
Attesting Officer            Commissioner of Patents